United States Patent
Lee

(10) Patent No.: US 6,574,204 B1
(45) Date of Patent: Jun. 3, 2003

(54) METHOD OF CANCELING INTERFERENCE COMPONENTS INCLUDED IN RECEIVED SIGNALS OF BASE STATION IN MOBILE COMMUNICATION SYSTEM

(75) Inventor: Young Jo Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/273,765

(22) Filed: Mar. 22, 1999

(30) Foreign Application Priority Data

Mar. 25, 1998 (KR) .......................................... 98-10327

(51) Int. Cl.$^7$ ............................. H04B 7/216; H04B 1/69
(52) U.S. Cl. ...................................... 370/335; 375/148
(58) Field of Search ................................ 370/335, 342, 370/328; 375/142, 143, 144, 148, 150, 152, 140, 141, 147, 132, 134, 137, 346, 349, 130, 225

(56) References Cited

U.S. PATENT DOCUMENTS

| | | | | |
|---|---|---|---|---|
| 5,463,660 A | * | 10/1995 | Fukasawa et al. | 375/150 |
| 5,467,368 A | * | 11/1995 | Takeuchi et al. | 375/148 |
| 5,533,012 A | * | 7/1996 | Fukasawa et al. | 375/148 |
| 5,978,414 A | * | 11/1999 | Nara | 375/130 |
| 6,088,383 A | * | 7/2000 | Suzuki et al. | 375/148 |
| 6,188,718 B1 | * | 2/2001 | Gitlin et al. | 375/148 |

OTHER PUBLICATIONS

Pulin Patel et al., "Analysis of a Simple Successive Interference Cancellation Scheme in a DS/CDMA System;" IEEE Journal on Selected Areas in Communications, Vo. 12, No. 5, Jun. 1994; pp. 796–807.

* cited by examiner

Primary Examiner—Tracy Legree
(74) Attorney, Agent, or Firm—Fleshner & Kim, LLP

(57) ABSTRACT

A method of canceling interference components included in received signals of a base station in a mobile communication system, despreads user data in the order of user data grouped for the unit of transmission rate and sequentially cancels user data which are the same as despread user data by allowing the base station to know transmission rate and user codes of user data transmitted from respective terminals, in case that the respective terminals transmit various user data which require various transmission rates in the mobile communication system of CDMA type. The method includes the steps of correlating user data in parallel using high transmission rate of data and user codes of respective terminals by receiving the user data transmitted from the respective terminals in the base station, the transmission rate of data and user codes of the respective terminals being in advance known by the base station, comparing the correlated resultant values with one another to decode one correlation value having one maximum value, and spreading the one correlation value having the maximum value using the user codes and subtracting user data obtained during spreading step from input user data.

18 Claims, 5 Drawing Sheets

METHOD OF CANCELING INTERFERENCE COMPONENTS INCLUDED IN RECEIVED SIGNALS OF BASE STATION IN MOBILE COMMUNICATION SYSTEM

BACKGROUND OF THE INVENTION

1. Field of the Invention

The present invention relates to a method of canceling interference components included in received signals of a base station in a mobile communication system, and more particularly, to a method of canceling interference components included in received signals of a base station in a mobile communication system, which allows user data not to serve as interference components for other user data by subtracting the user data from received signals which are standby for decoding the other user data.

2. Background of the Related Art

Generally, in a mobile communication system based on code division multiple access (CDMA) type, respective mobile terminals transmit transmission data by spreading with its own unique PN sequences so that the data can be transmitted to the closest base station with the same radio frequency shared by other users. That is to say, communication between the base station and a plurality of terminals will be performed with the same radio channel. In the mobile communication system based on CDMA type, the plurality of terminals in the same base station area transmit scrambled data to the base station using the same radio channel. Accordingly, a receiving portion of the base station converts received signals including a plurality of user data into base band signals when the plurality of terminals in the service area of base station receive the user data. The receiving portion despreads the base band signals using the unique PN sequences of the respective terminals to identify, which have been known by the base station, and decodes them to decode them to original data. The process is limited by the interference generated by the other transmitters.

FIG. 1 is a block diagram illustrating a partial configuration of a typical base station receiving portion.

Referring to FIG. 1, radio signals transmitted from respective terminals are input to a frequency down processor 10 of the base station through an antenna of the base station and then converted into base band signals. Such base band signals are in parallel input to a plurality of multipliers 21a~21n of a composite correlation bank 20 so that the base band signals are respectively multiplied by the unique PN sequences $C_1 e^{jo1}, C_2 e^{jo2}, \ldots, C_N e^{joN}$ of the respective terminals, which have been already known by the base station. Subsequently, spreading values output from the respective multipliers 21a~21n are respectively input to a plurality of accumulators 22a~22n which are connected to the multipliers 21a~21n in series, and then stored as correlation values corresponding to the respective user data for the unit of symbol(or frame).

The respective accumulators 22a~22n transmit the user data stored for the unit of symbol(or frame) to the next circuit to decode them to original signals.

The base station receiving portion of FIG. 1 is supposed on the assumption that all the user data transmitted from the respective terminals have the same transmission rate. In other words, it is noted that such a base station receiving portion is supposed taking account of only mobile communication system which support only voice service. Accordingly, such a base station receiving portion has simple hardware configuration and processes data at relatively high speed because it detects user signals including interference signals. On the other hand, since the base station receiving portion of FIG. 1 detects the user signals without canceling the interference components, it has a problem that receiving performance is poor, thereby reducing traffic capacity of the overall system.

To solve such a problem, there is suggested a related art base station receiving portion disclosed in "IEEE JOURNAL ON SELECTED AREAS IN COMMUNICATIONS (VOL. 12, NO. 5, JUNE 1994)", as shown in FIG. 2.

Referring to FIG. 2, data transmitted from respective terminals in a corresponding base station are input to a frequency down processor 100 through an antenna of the base station and converted into base band signals. Subsequently, the base band signals output from the frequency down processor 100 are stored in a memory 200 for the unit of symbol (or frame). The base band signals stored in the memory 200 are input to a plurality of multipliers 310a~310n of a composite correlation bank 300 in parallel, so that the base band signals are respectively multiplied by the unique PN sequences $C_1 e^{jo1}, C_2 e^{jo2}, \ldots, C_N e^{joN}$ of the respective terminals, which have been known by the base station, to obtain correlation values. Subsequently, output signals of the respective multipliers 310a~310n are respectively input to a plurality of accumulators 320a~320n which are connected to the multipliers 310a~310n in series, and then stored as correlation values corresponding to the respective user data for the unit of symbol (or frame).

Thereafter, the respective accumulators 320a~320n provides correlation values output from the respective multipliers 310a~310n to a comparator 400 connected to the respective multipliers 310a~310n for the unit of symbol (or frame) in parallel. The comparator 400 compares the correlation values output from the respective accumulators 320a~320n with one another to detect one user data having the maximum value. At this time, the detected maximum correlation value is transmitted to the next circuit to be decoded to original data.

Unlike the base station receiving portion of FIG. 1, the user data detected to be decoded to original data are to be feedback to the memory 200 and subtracted from the base band signals including a plurality of user data, so that the detected user data do not serve as interference components for other user data during the next despreading step.

In other words, the correlation value having the maximum value, which is output from the comparator 400, is also input to a multiplier 500 so that the correlation value is multiplied by the unique PN sequences $C_1 e^{jo1}, C_2 e^{jo2}, \ldots, C_N e^{joN}$ of the terminal used for spreading. Signals spread again through the multiplier 500 are provided to a subtracter 600. The subtracter 600 subtracts only the same spread signal as the input spread signal from the base band signals stored in the memory 200. Accordingly, the decoded user data are fully canceled from the base band signals stored in the memory 200.

Subsequently, the base band signals stored in the memory 200 are again input to the plurality of multipliers 310a~310n of the composite correlation bank 300 in parallel, so that the base band signals are respectively multiplied by the unique PN sequences $C_1 e^{jo1}, C_2 e^{jo2}, \ldots, C_N e^{joN}$ of the respective terminals to obtain correlation values having next priority. The output signals of the respective multipliers 310a~310n are respectively input to the accumulators 320a~320n which are connected to the multipliers 310a~310n in series, and then stored as correlation values corresponding to the respective user data for the unit of symbol (or frame).

Then, the respective accumulators 320a~320n provides correlation values output from the respective multipliers 310a~310n to the comparator 400 connected to the respective multipliers 310a~310n for the unit of symbol (or frame). The comparator 400 compares the correlation values output from the respective accumulators 320a~320n with one another to detect one user data having the maximum value. At this time, the detected maximum correlation value is transmitted to the next circuit to be decoded to original data.

As aforementioned, the base station receiving portion of FIG. 2 performs despreading and decoding operations in the order of the user data having the maximum correlation value until there exists no user data in the memory 200, and subtracts only the same spread signal as input spread signal from the base band signals stored in the memory 200 in the order of detected user data to sequentially cancel already decoded user data.

However, such a related art base station receiving portion has several problems.

Since the aforementioned operations should be performed repeatedly until the plurality of user data included in one frame are sequentially despread and decoded to be sequentially canceled, counting time and counting amount for despreading and decoding the received signals of the base station and canceling the despread and decoded user data from the memory have serious deviation depending on the number of the current users. Also, since the receiving portion of FIG. 2 is envisioned on the assumption that the current users have the same data transmission rate, it is undesirable for multimedia services supporting various transmission rates.

Furthermore, it is difficult for the related art base station receiving portion to reduce the number of correlators used for despread of received base band signals. This goes back to the trend to small sized communication systems which improve complexity in hardware.

SUMMARY OF THE INVENTION

Accordingly, the present invention is directed to a method of canceling interference components included in received signals in a base station of a mobile communication system, that substantially obviates one or more of the problems due to limitations and disadvantages of the related art.

An object of the present invention is to provide a method of canceling interference components included in received signals of a base station in a mobile communication system, which despreads user data in the order of user data grouped for the unit of transmission rate and sequentially cancels user data which are the same as despread user data by allowing the base station to detect transmission rate and user codes of user data transmitted from respective terminals, in case that the respective terminals transmit various user data which require various transmission rates in the mobile communication system of CDMA type.

Other object of the present invention is to provide a method of canceling interference components included in received signals of a base station in a mobile communication system, which minimizes the number of correlators for despreading received signals of the base station to reduce counting time and counting amount for despread and reduce complexity in hardware.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of canceling interference components included in received signals of a base station in a mobile communication system is characterized in that the base station receives user data transmitted from respective terminals in its own area to sequentially perform grouping of the user data in the order of high transmission rate using transmission rate of the respective user data and user codes of the respective terminals, which are in advance known. Subsequently, the grouped user data are correlated in parallel to coincide with the number of correlators which support the system. Then, the correlated resultant values are compared with one another to decode one correlation value having the maximum value, and one correlation value having the maximum value is spread using the user codes, so that user data obtained during spreading step are subtracted from input user data.

In another aspect, a method of canceling interference components included in received signals of a base station in a mobile communication system is characterized in that the base station receives user data transmitted from respective terminals in its own area to perform grouping of a plurality of user data depending on already known transmission rate of the data. Subsequently, the user data are correlated in parallel for the unit of group using user codes of the respective terminals, which have been known by the base station, and then decoded to be decoded to original data. Then, the correlated resultant values are spread in parallel for the unit of group using the user codes, and a plurality of user data obtained during spreading step are canceled from input user data for the unit of group.

In other aspect, an apparatus for canceling interference components included in received signals in a base station of a mobile communication system, includes a memory for storing user data transmitted from at least one or more terminals for the unit of symbol(or frame), a central processing unit (CPU) for knowing both transmission rate of data to be transmitted and user codes of respective terminals if the respective terminals perform communication, to select user data included the data to be transmitted with at least one or more groups depending on transmission rate, a correlation portion for correlating user data pertaining to a group having the highest priority among the groups selected using the user codes, and a spreading portion for spreading the correlated resultant values using the user codes and providing user data obtained during spreading step to the memory in parallel to sequentially subtract the user data stored in the memory.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
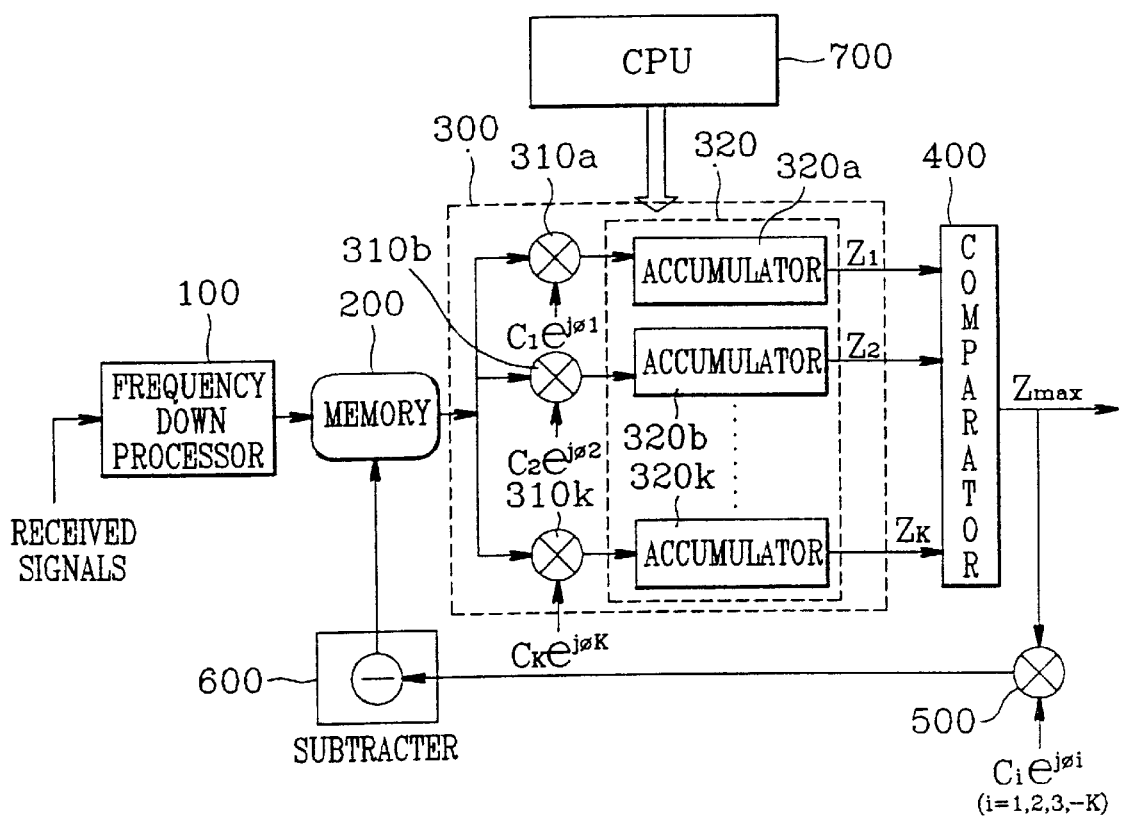
FIG. 3 is a block diagram illustrating a base station receiving portion according to one embodiment of the present invention.

FIG. 3 is a block diagram illustrating a base station receiving portion according to one embodiment of the present invention.

Referring to FIG. 3, the base station receiving portion according to one embodiment of the present invention includes a frequency down processor 100 for converting radio signals received through an antenna into base band signals, a memory 200 for storing the base band signals output from the frequency down processor 100 for the unit of symbol(or frame), a central processing unit (CPU) 700 for knowing both transmission rate of data to be transmitted during communication of respective terminals and the unique PN sequences of the respective terminals to perform grouping user data depending on transmission rate, a composite correlation bank 300 for correlating the user data grouped using the unique PN sequences in the order of a group having the highest transmission rate, a comparator 400 for comparing output values of the composite correlation bank 300 with one another to detect the maximum correlation value, a multiplier 500 for spreading output signals of the comparator 400 using the unique PN sequences, and a subtracter 600 for subtracting the user data output from the multiplier 500 from the user data stored in the memory 200.

The composite correlation bank 300 includes a plurality of multipliers 310a~310k for correlating one group and a plurality of accumulators 320a~320k connected to the respective multipliers 310a~310k in series.

The operation of the aforementioned base station receiving portion will be described with reference to FIG. 4.

Figure 4:
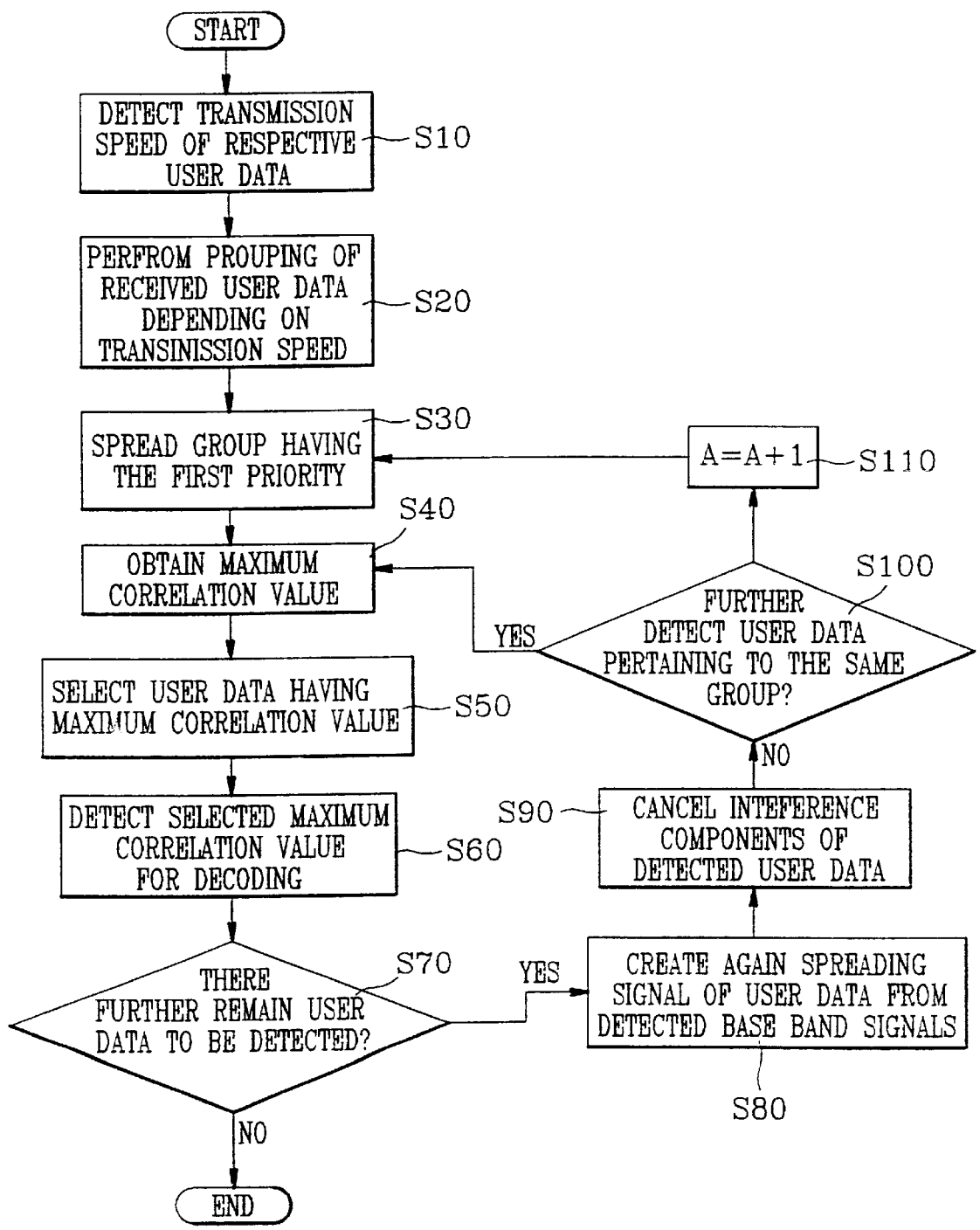
FIG. 4 is a flow chart illustrating the cancellation operation of interference components of a base station receiving portion shown in FIG. 3.

Referring to FIG. 4, in case that the respective terminals in the base station area perform communication at various transmission rates, the base station in advance knows the unique PN sequences $C_1 e^{jo1}$, $C_2 e^{jo2}$, . . . , $C_K e^{joK}$ of the respective terminals and transmission rate of user data to be transmitted from the respective terminals (S10). Such PN sequences and transmission rate can be known in advance by communication protocol between the respective terminal and the base station. For example, the respective terminals may voluntarily transmit information on both data transmission rate for its service option and its the unique PN sequences $C_1 e^{jo1}$, $C_2 e^{jo2}$, . . . , $C_K e^{joK}$ to the base station. Otherwise, the respective terminals may transmit the required information to the base station by request of the base station.

Subsequently, the radio signals received through the antenna of the base station are converted into the base band signals by the frequency down processor 100 and then stored in the memory 200 for the unit of symbol(or frame). Then, the CPU 700 in the base station reads out the signals stored in the memory 200 for the unit of symbol(or frame) and performs grouping of them in the order of the highest transmission rate of the user data (S20). It is, for example, assumed that the user data stored in one frame of the memory 200 are respectively provided from a plurality of terminals MS1~MS12 and that the terminals MS2, MS4, MS7 and MS8 have transmission rate of 9.6 Kbps, the terminals MS1, MS3 and MS11 have transmission rate of 14.4 Kbps, the terminals MS6 and M12 have transmission rate of 1 Mbps, and the terminals M55, MS9 and MS10 have transmission rate of 2 Mbps. In this case, the CPU 700 performs grouping of the terminals MS5, MS9 and MS10 having the highest transmission rate as a group A having the first priority, the terminals MS6 and MS12 as a group B having the second priority, the terminals MS1, MS3 and MS11 as a group C having the third priority, and the terminals MS2, MS4, MS7 and MS8 as a group X having the fourth priority. At this time, if the number of the user data transmitted from the terminals is greater than the number of the multipliers and the accumulators of the composite correlation bank 300, despreading and decoding operations are performed a predetermined number of times. In the embodiment of the present invention, the term "grouping" does not mean that the order of the data is changed in the frame but means that the user data transmitted from the respective terminals MS1~MS12 are recognized to correspond to set groups.

Subsequently, among the base band signals stored in one frame of the memory 200, the user data from the terminals MS5, MS9 and MS10 of the group A having the first priority are despread (S30).

Respective correlation values corresponding to the user data from the terminals MS5, MS9 and MS10 pertaining to the group A are obtained (S40). For example, the correlation values are obtained in such a manner that the base band signals stored in the memory 200 are input to the multipliers 310a~310k in parallel and the unique PN sequences $C_1 e^{jo1}$, $C_2 e^{jo2}$, . . . , $C_N e^{joN}$ the respective terminals, in advance known by the base station, are respectively multiplied by the base band signals. The outputs of the respective multipliers 310a~310k are stored in the accumulators 320a~320k.

The respective accumulators 320a~320k provide their output values to the comparator 400 whenever accumulating operation is completed for the unit of symbol(or frame). The comparator 400 compares the correlation values from the respective accumulators 320a~320k with one another to select the user data having the maximum correlation value (S50). The selected maximum correlation value is detected by the next circuit of the comparator 400 to be decoded to its original signal (S60). Accordingly, if the user data transmitted from the terminal MS5 among the user data from the terminals MS5, MS9 and MS10 pertaining to the group A have the maximum correlation value, the maximum correlation value from the terminal MS5 is detected.

At this time, the CPU 700 in the base station determines whether or not the user data to be detected further remain in the memory 200 (S70). If the user data to be detected further remain in the memory 200, the cancellation operation of Interference components, which will be described below, is performed so as to prevent the user data transmitted from the terminal MS5 of the already detected group A from acting as interference components on the other user data during the next despreading operation. In other words, the output signals of the comparator 400 are also input to the multiplier 500 and then multiplied by the unique PN sequences of the terminal MS5, which have been already known by the base station, to create again spreading signals (S80).

Subsequently, despreading signals of the user data of the terminal .MS5, which are created again by the multiplier 500, are input to the subtracter 600. The user data transmitted from the same terminal MS5 are subtracted from the base band signals stored in the memory 200 (S90). Therefore, the user data which serve as the most significant interference components on the other user data are canceled from the base band signals of the group A stored in the memory 200, and the user data transmitted from the terminals MS9 and MS10 remain.

The CPU 700 in the base station determines whether or not the user data pertaining to the group A further remain (S100). If the user data pertaining to the group A further remain, the above steps S40~S90 repeat. However, if the user data pertaining to the group A do not remain, the above steps S40~S90 in connection with the user data transmitted from the terminals MS6 and MS12 pertaining to the group B having the second priority A+1 repeat.

In one embodiment of the present invention, in the same manner as the aforementioned operation, despreading and decoding operations are sequentially performed for the unit of group until there are no user data to be canceled in the base band signals stored in the memory 200.

Figure 1:
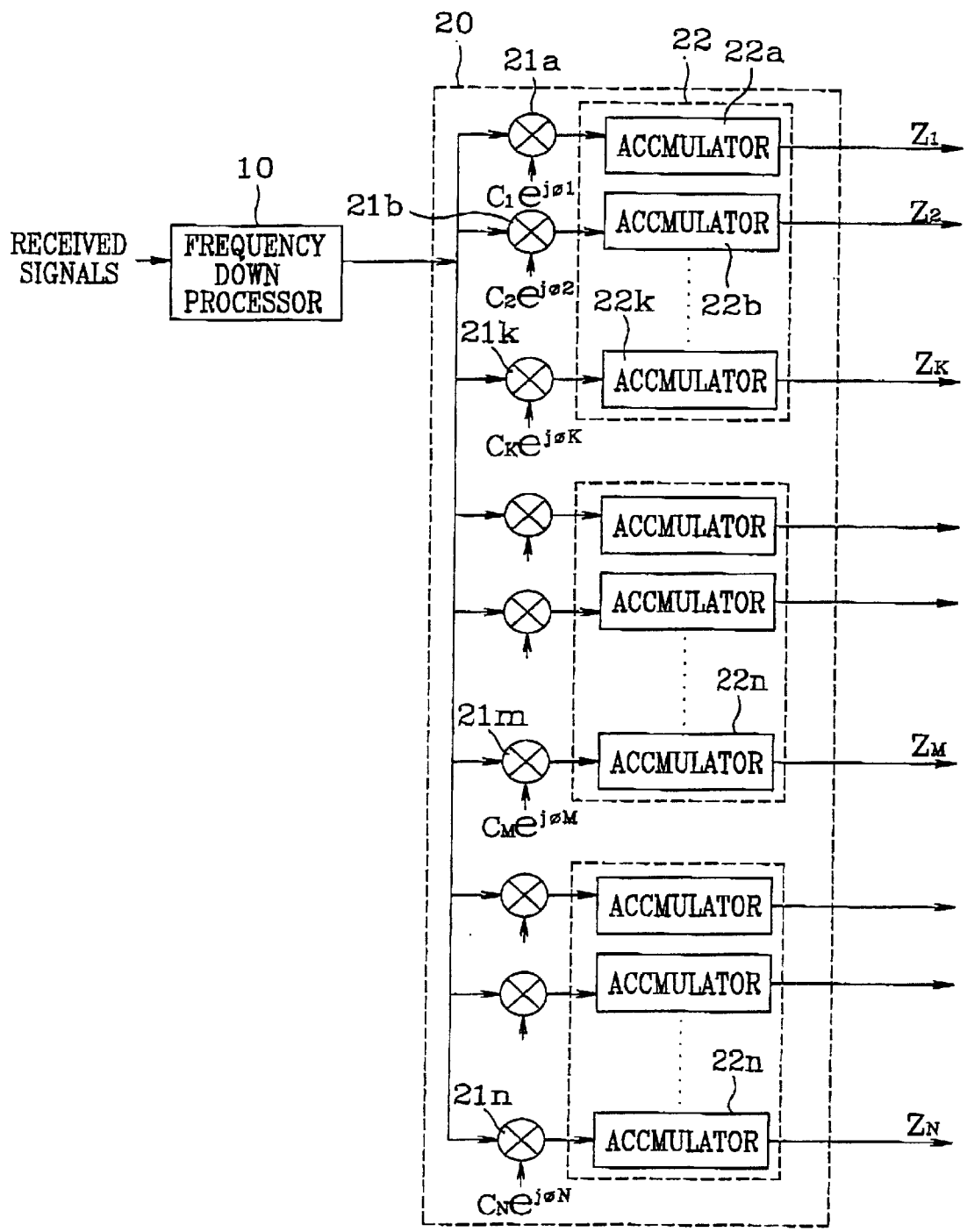
FIG. 1 is a block diagram illustrating a partial configuration of a typical base station receiving portion.
Figure 2:
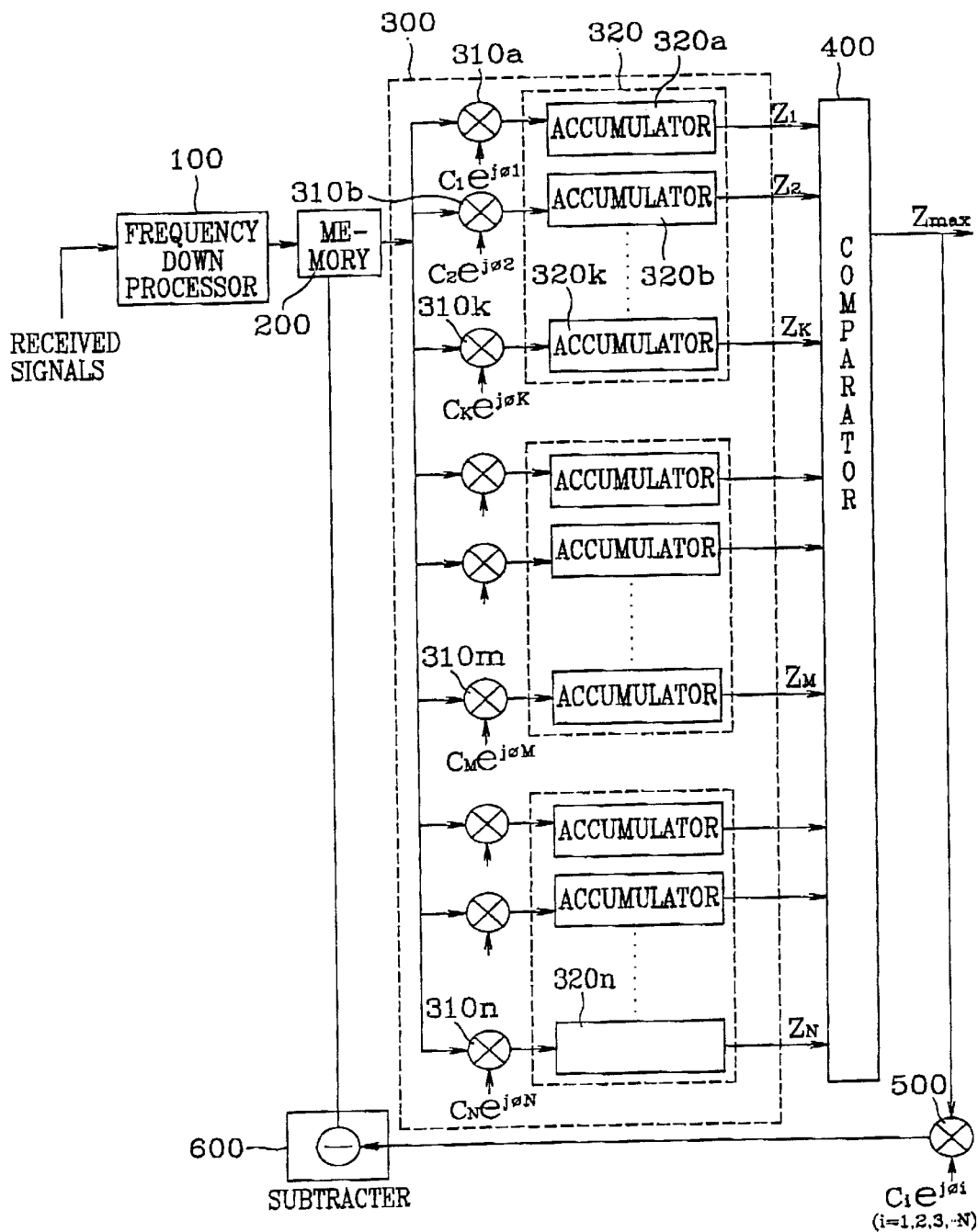
FIG. 2 is a block diagram illustrating a related art base station receiving portion.

However, in order to processing speed of the base station receiving portion, some groups may be selected by grouping to perform despreading and decoding operations. For the other groups not selected by grouping, decoding operation may be performed by the typical technology shown in FIG. 1. For example, the base station receiving portion sequentially selects the group A having the first priority, the group B having the second priority, the group C having the third priority to sequentially process the groups. The user data transmitted from the other terminals not selected by grouping are processed by the typical processing method. In other words, in case of receiving image data of relatively highest transmission rate, corresponding user data are processed by grouping, while in case of receiving voice data, corresponding user data are processed by the typical technology shown in FIG. 1. This reduces counting amount and counting time for despreading and decoding.

Figure 5:
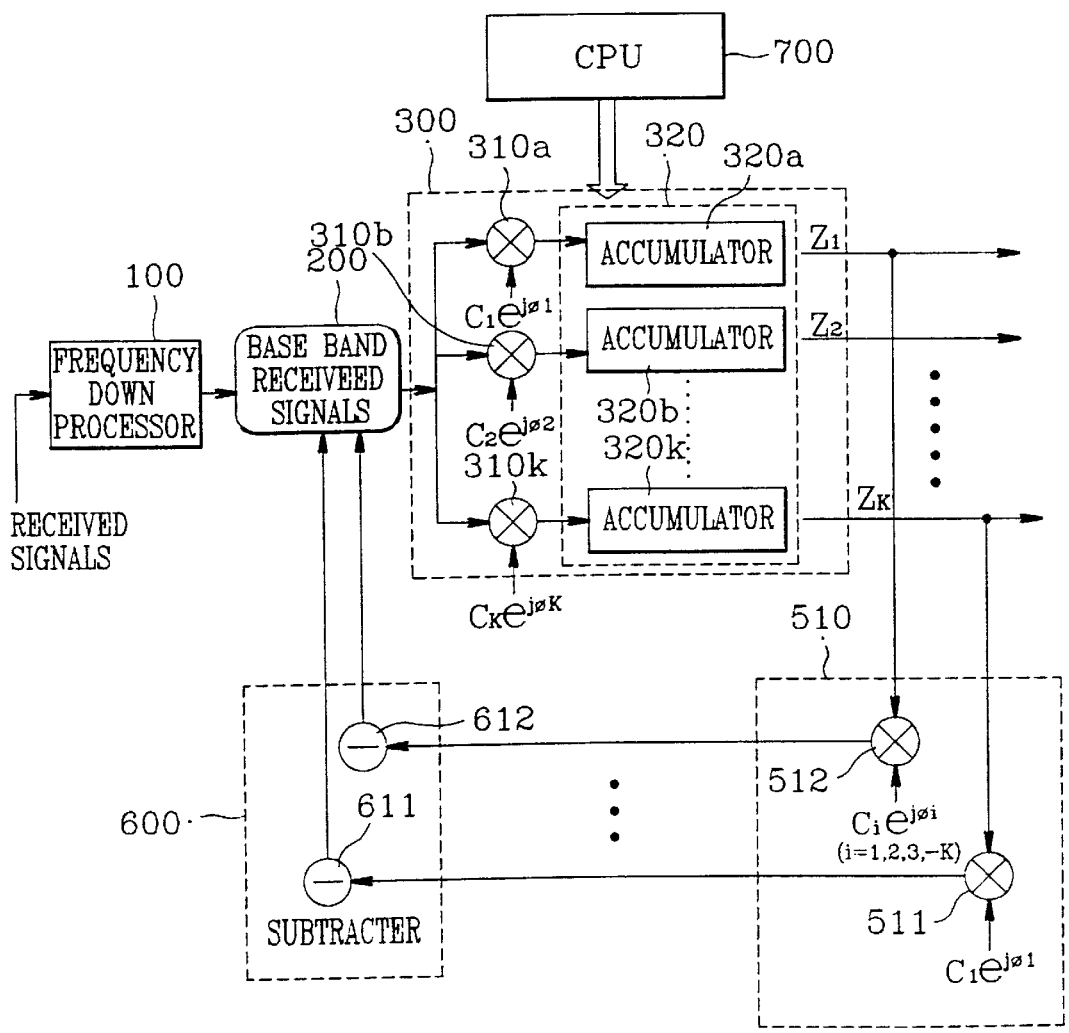
FIG. 5 is a block diagram illustrating a base station receiving portion according to other embodiment of the present invention.

FIG. 5 is a block diagram illustrating a base station receiving portion according to other embodiment of the present invention.

Referring to FIG. 5, the base station receiving portion according to other embodiment of the present invention includes a frequency down processor 100 for converting radio signals transmitted from terminals into base band signals, a memory 200 for storing user data output from the frequency down processor 100 for the unit of symbol (or frame), a central processing unit (CPU) 700 for knowing both transmission rate of data to be transmitted during communication of the respective terminals and the unique PN sequences $C_1 e^{j o 1}, C_2 e^{j o 2}, \ldots, C_K e^{j o K}$ of the respective terminals so as to perform grouping of the user data depending on transmission rate, a composite correlation bank 300 for in parallel correlating user data pertaining to a group having the highest priority among groups selected using the unique PN sequences $C_1 e^{j o 1}, C_2 e^{j o 2}, \ldots, C_K e^{j o K}$, a spreading portion 510 for spreading output values of the composite correlation bank 300 using the unique PN sequences, and a subtracting portion 600 for subtracting the user data in parallel output from the spreading portion 510 from the user data stored in the memory 200.

The spreading portion 510 includes a plurality of multipliers 511 and 512. The subtracting portion 600 includes a plurality of subtracters 611 and 612 between the memory 200 and the spreading portion 510, for in parallel canceling the user data in parallel output from accumulators 320a~320k.

The base station receiving portion according to the other embodiment of the present invention is different from the base station receiving portion according to the first embodiment of the present invention, shown in FIG. 3, in that the correlation values corresponding to one group or some groups in parallel output from the respective accumulators 320a~320k are decoded in parallel and are to be feedback to the memory 200 in parallel.

The operation of the base station receiving portion according to the other embodiment of the present invention will be described with reference to FIG. 5.

Referring to FIG. 5, in case that the respective terminals in the base station area perform communication at various transmission rates, the base station in advance knows the unique PN sequences $C_1 e^{j o 1}, C_2 e^{j o 2}, \ldots, C_K e^{j o K}$ of the respective terminals and transmission rate of user data to be transmitted from the respective terminals. Radio signals received through an antenna of the base station are converted into base band signals by the frequency down processor 100 and then stored in the memory 200 for the unit of symbol (or frame). Then, the CPU 700 in the base station reads out the signals stored in the memory 200 for the unit of symbol (or frame) and performs grouping of them in the order of the highest transmission rate of the user data. It is, for example, assumed that the user data stored in one frame of the memory 200 are respectively provided from a plurality of terminals MS1~MS12 (FIG. 3) and that the terminals MS2, MS4, MS7 and MS8 have transmission rate of 9.6 Kbps, the terminals MS1, ,MS3 and MS11 have transmission rate of 14.4 Kbps, the terminals MS6 and MS12 have transmission rate of 1 Mbps, and the terminals MS5, MS9 and MS10 have transmission rate of 2 Mbps. In this case, the CPU 700 performs grouping of the terminals MS5, MS9 and MS10 having the highest transmission rate as a group A having the first priority, the terminals MS6 and MS12 as a group B having the second priority, the terminals MS1, MS3 and MS11 as a group C having the third priority, and the terminals MS2, MS4, MS7 and MS8 as a group X hang the fourth priority. At this time, if the number of the user data transmitted from the terminals is greater than the number of the multipliers and the accumulators of the composite correlation bank 300, despreading and decoding operations are performed a predetermined number of times.

Subsequently, among the base band signals stored in one frame of the memory 200, the user data from the terminals MS5, MS9 and MS10 of the group A having the first priority are despread in parallel.

Respective correlation values corresponding to the user data from the terminals MS5, MS9 and MS10 pertaining to the group A are obtained in parallel. For example, the correlation values are obtained in such a manner that the base band signals stored in the memory 200 are input to the multipliers 310a~310k in parallel, and then respectively multiplied by the unique PN sequences $C_1 e^{j o 1}, C_2 e^{j o 2}, \ldots, C_N e^{j o N}$ of the respective terminals, in advance known by the base station. The outputs of the respective multipliers 310a~310k are stored in the accumulators 320a~320k.

The respective accumulators 320a~320k provide their output values to the next circuit whenever accumulating operation is completed for the unit of symbol(or frame), so as to decode the values to original signals. Accordingly, the user data provided from the terminals MS5, MS9 and MS10 pertaining to the group A are all output for decoding.

At this time, the CPU 700 in the base station determines whether or not the user data to be detected further remain in the memory 200. If the user data to be detected further remain in the memory 200, the cancellation operation of interference components, which will be described below, is performed so as to prevent the user data transmitted from the terminal MS5, MS9 and MS10 of the already detected group A from acting as interference components on the user data pertaining to the other group during the next despreading operation. In other words, the output signals of the respective accumulators 320a~320k are also input to the multipliers 511 and 512 in parallel and then respectively multiplied by the unique PN sequences of the terminals MS5, MS9 and MS10, which have been already known by the base station, to create again spreading signals.

Subsequently, despreading signals of the user data of the terminals MS5, MS9 and MS10 created again by the multipliers 511 and 512 are input to the subtracters 611 and 612. Then, the user data transmitted from the same terminals MS5, MS9 and MS10 are subtracted from the base band signals stored in the memory 200. Therefore, the user data which pertain to the group A and serve as the most significant interference components on the other user data are canceled from the base band signals of all the groups stored in the memory 200, and the user data Transmitted from the terminals pertaining to the other groups remain.

Thereafter, the CPU 700 in the base station determines whether or not the user data pertaining to the other groups further remain. If the user data pertaining to the other groups further remain, the above steps repeat in the same method as that of FIG. 3. However, if the user data pertaining to the other groups do not further remain, the aforementioned despreading and decoding operations repeat in connection with the user data transmitted from the terminals MS6 and MS12 pertaining to the group B having the second priority A+1.

In the other embodiment of the present invention, all the operations are very similar to those of the first embodiment shown in FIG. 3. However, in the other embodiment of the present invention, the output signals of the respective accumulators 320a~320k of the composite correlation bank 300 are output in parallel for decoding. If there are any user data groups not processed in the memory 200, the output signals of the respective accumulators 320a~320k of the composite correlation bank 300 are correlated in parallel and then subtracted in parallel through the subtracters 611 and 612. Therefore, the base station receiving portion shown in FIG. 5 has an advantage that improves whole counting speed, even though it increases complexity in hardware as compared with FIG. 3.

As aforementioned, the base station receiving portion according to the present invention has the following advantages.

The CPU in the base station in advance knows user codes of the terminal to be transmitted and data transmission rate in even case that the respective terminals transmit the user data at various transmission rates under the mobile communication system of CDMA type. Then, despreading and decoding operations of received signals of the base station are performed in the order of the highest transmission rate of data, so that interference components corresponding to the user data processed or not processed are sequentially canceled in the order of data transmission rate. Accordingly, since despreading and decoding processing order of the user data is in advance determined, the base station receiving portion of the present invention can achieve reduced counting amount and fast counting time as compared with the related art base station receiving portion in even case that the respective terminals transmit data at various transmission rates. In addition, since the base station receiving portion having a minimum number of correlators can achieve relatively reduced counting amount and fast counting time, complexity in hardware can be reduced.

It will be apparent o those skilled in the art that various modifications and variations can be made in the method of canceling interference components included in received signals in a base station of a mobile communication system according to the present invention without departing from the spirit or scope of the invention. Thus, it is intended that the present invention covers the modifications and variations of the invention provided they come within the scope of the appended claims and their equivalents.

What is claimed is:

1. A method of canceling interference components included in received signals in a base station of a mobile communication system, comprising:
   a1) knowing transmission rates of data to be transmitted from respective mobile terminals from among a plurality of transmission rates, and user codes of the respective mobile terminals, if the respective mobile terminals perform communication;
   b1) storing user data transmitted from at least one mobile terminal for a prescribed unit of data;
   c1) making a plurality of groups for the stored user data corresponding to the transmission rates;
   d1) correlating the user data pertaining to a group having a highest priority among the plurality of groups using the known user codes;
   e1) comparing the correlated values with one another to decode one correlation value having one maximum value; and
   f1) spreading the correlation value having the maximum value using the known user codes and subtracting the user data obtained during spreading step from the stored user data.

2. The method of claim 1, wherein the prescribed unit of data is one of a symbol and a frame.

3. The method of claim 1, wherein the priority of the grouped data is determined in the order of relatively high transmission rate to relatively low transmission rate.

4. The method of claim 1, wherein, if there remains the user data, which is not subtracted, after performing the step f1), the steps d1) and f1) repeat so as to sequentially subtract the remaining user data, which is not subtracted, from the stored user data.

5. The method of claim 1, wherein, if the number of the user data pertaining to one group is greater the number of correlators provided to the base station, steps d1) and f1) repeat a predetermined number of times depending on the number of the correlators.

6. The method of claim 5, wherein step d1) further comprises:
   branching the stored user data into multi-paths corresponding to the number of the correlators;
   respectively multiplying the branched signals by the known user codes; and
   accumulating the multiplied resultant value.

7. A method of canceling interference components included in received signals in a base station of a mobile communication system, comprising:
   a2) knowing transmission rates from among a plurality of transmission rates of data to be transmitted from respective terminals and user codes of the respective terminals, if the respective terminals perform communication;

b2) storing user data transmitted from at lease one terminal for a prescribed unit of data;

c2) making a plurality of groups for the stored user data corresponding to the transmission rates;

d2) correlating the user data pertaining to a group having a highest priority among the plurality of groups selected using the known user codes; and e2) spreading the correlated resultant values in parallel using the known user codes and subtracting a plurality of user data obtained during spreading from the stored user data.

8. The method of claim 7, wherein the prescribed unit of data is one of a symbol and a frame.

9. The method of claim 7, wherein the priority of the grouped data in step d2) is determined in an order of relatively high transmission rate to relatively low transmission rate.

10. The method of claim 7, wherein, if there remains user data, which is not subtracted, after performing step e2), steps d2) and e2) repeat so as to sequentially subtract the remaining user data from the stored user data.

11. The method of claim 7, wherein, if the number of the user data pertaining to one group is greater than the number of correlators provided to the base station, steps d2) and e2) repeat a predetermined number of times depending on the number of the correlators.

12. The method of claim 11, wherein step d2) further comprises:

branching the stored user data into multi-paths corresponding to the number of the correlators;

respectively multiplying the branched signals by the known user codes; and accumulating the multiplied resultant value.

13. An apparatus for canceling interference components included in received signals in a base station of a mobile communication system, comprising:

a memory configured to store user data transmitted from at least one terminal for a prescribed unit of data;

a central processing unit (CPU) configured to know both transmission rates from among a plurality of transmission rates of data to be transmitted and user codes of respective terminals if the respective terminals perform communication, to group user data into a plurality of groups according to the transmission rate;

a correlation portion configured to correlate user data pertaining to a group having a highest priority among the plurality of groups using the user codes; and a spreading portion configured to spread the correlated resultant values using the user codes and provide user data obtained during spreading to the memory in parallel to sequentially subtract the user data stored in the memory.

14. The apparatus of claim 13, wherein the spreading portion includes at least two multipliers, and at least two accumulators connected to the multipliers in series.

15. The apparatus of claim 13, further comprising a subtracting portion having at least two subtracters between the memory and the spreading portion, and configured to subtract the user data from the transmitted data.

16. A method of canceling interference components included in received signals in a base station of a mobile communication system, comprising:

despreading user data groups in the order of highest transmission rate by receiving user data transmitted, in case that respective mobile terminals transmit data to the base station at various data transmission rates; and decoding at least one or more correlation values having a maximum value among the despread resultant values sequentially one by one or for the unit of group in parallel.

17. The apparatus of claims 13, wherein the prescribed unit of data comprises one of a symbol and a frame.

18. The method of claim 16, wherein a number of user data groups is at least 2.

* * * * *